United States Patent
Sham

(10) Patent No.: US 11,563,838 B1
(45) Date of Patent: Jan. 24, 2023

(54) FOLDING PHONE-SUPPORT DEVICE

(71) Applicant: Douglas Sham, Sarasota, FL (US)

(72) Inventor: Douglas Sham, Sarasota, FL (US)

( * ) Notice: Subject to any disclaimer, the term of this patent is extended or adjusted under 35 U.S.C. 154(b) by 0 days.

(21) Appl. No.: 17/462,171

(22) Filed: Aug. 31, 2021

(51) Int. Cl.
*H04M 1/12* (2006.01)
*H04M 1/02* (2006.01)

(52) U.S. Cl.
CPC ........... *H04M 1/12* (2013.01); *H04M 1/0202* (2013.01)

(58) Field of Classification Search
CPC ...... H04M 1/12; H04M 1/0202; F16M 11/18; F16M 11/04; A47B 2023/049; A47G 2001/146
See application file for complete search history.

(56) References Cited

U.S. PATENT DOCUMENTS

| | | |
|---|---|---|
| 5,187,744 A | 2/1993 | Richter |
| 6,135,408 A | 10/2000 | Richter |
| 6,888,940 B1 * | 5/2005 | Deppen ............... B60R 11/0241 379/454 |
| 6,966,533 B1 | 11/2005 | Kalis et al. |
| 9,695,849 B2 | 7/2017 | Zhou et al. |
| 10,237,384 B2 | 3/2019 | Holder |
| 10,844,997 B1 * | 11/2020 | Loew ..................... F16M 13/00 |
| 2005/0044673 A1 * | 3/2005 | Huang ..................... A47G 1/17 24/303 |
| 2008/0061210 A1 | 3/2008 | Carnevali |
| 2010/0320341 A1 | 12/2010 | Baumann et al. |
| 2012/0001045 A1 * | 1/2012 | Wang ..................... F16M 11/38 248/281.11 |
| 2015/0070839 A1 * | 3/2015 | Johnson ................. F16M 11/10 248/205.6 |
| 2020/0070735 A1 | 3/2020 | Kipper |
| 2021/0099031 A1 * | 4/2021 | Jol ............................. H02J 7/02 |

FOREIGN PATENT DOCUMENTS

| | | | |
|---|---|---|---|
| CN | 206259994 U | * | 6/2017 |
| CN | 212137742 U | * | 12/2020 |
| KR | 200432572 | | 12/2006 |

* cited by examiner

*Primary Examiner* — Ankur Jain
*Assistant Examiner* — Angelica Perez
(74) *Attorney, Agent, or Firm* — Larson & Larson; Justin P. Miller; Frank Liebenow

(57) ABSTRACT

The folding phone support device removably attaches to the rear face of any smartphone. In its preferred embodiment, the folding phone support device uses a phone plate, affixed to the phone via a double-sided adhesive. The phone plate includes recesses that interact with latches in the base of the folding phone support device, allowing the folding phone support device to be attached and detached from the phone.

17 Claims, 14 Drawing Sheets

FOLDING PHONE-SUPPORT DEVICE

FIELD

This invention relates to the field of phone stands and mounts and more particularly to a device that allows a user to support a phone on both vertical and horizontal surfaces.

BACKGROUND

Mobile phones are ubiquitous. Much more than a means of making a phone call, a mobile phone is now our always-on, all-day companion. The addition of an integrated camera to the microphone and speaker have resulted in an easy means for participation in video conferences. While conferences were a tool for business meetings, use has expanded into all parts of life, from dinners with remote family to physical training.

With the wide variety of activities, users need to securely place their phones in various positions throughout their home or workplace. This can include on the kitchen table, on the wall, affixed to a mirror, or mounted to metal fitness equipment.

What is needed is a single support device that will accommodate this variety of mounting and placement positions, while folding away when unneeded.

SUMMARY

The folding phone support device removably attaches to the rear face of any smartphone. In its preferred embodiment, the folding phone support device uses a phone plate, affixed to the phone via a double-sided adhesive. The phone plate includes recesses that interact with latches in the base of the folding phone support device, allowing the folding phone support device to be attached and detached from the phone.

In a second embodiment, the phone includes recesses, or other means, of affixing to the base of the folding phone support device without requiring a separate plate.

In a third embodiment, the phone plate is integrated into a phone case, avoiding the need for a separate phone plate.

The base includes a head that nests within a head chamber. The head is double-sided, and includes one or more temporary attachment mechanisms, such as a suction cup side and/or one or more magnets. By allowing the head to rise out of the head chamber and rotate, the desired side of the head can be selected. The head can then either be placed back into the head chamber, or left supported by the arms to which it is rotatably connected.

When the head is placed back in the head chamber, the head can then hold the phone against a vertical surface. For example, a mirror when using the suction side of the head, or metal fitness equipment when using the magnetic side of the head.

When extended, the arms work in combination with the head to support the phone. The phone can be supported in a vertical position or a horizontal position.

While the arms move and rotate in parallel, they are spaced from each other, separated by the base and separated by the head. The arms can be nested parallel to the base, or rotated outward from the base, in a non-parallel, or angled, position.

The base includes one or more flaps that slide into the path of each arm, allowing the user to block the folding action. This prevents the arms from folding while supporting the phone.

There are multiple means to hold the arms and head in a folded position including magnetic locking and a mechanical latch.

Regarding magnetic locking, the first option is a central metal plate placed in the head chamber, interacting with the magnet in the head to hold the head in a folded position. The second option is one or more secondary metal plates that interact with magnets in the arms to hold the arms against the base.

Regarding a mechanical latch, the arms can be held in a folded position using a latch connected to the body. When the user wishes to unfold, the latch is pulled back, and the arms are free to rotate.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
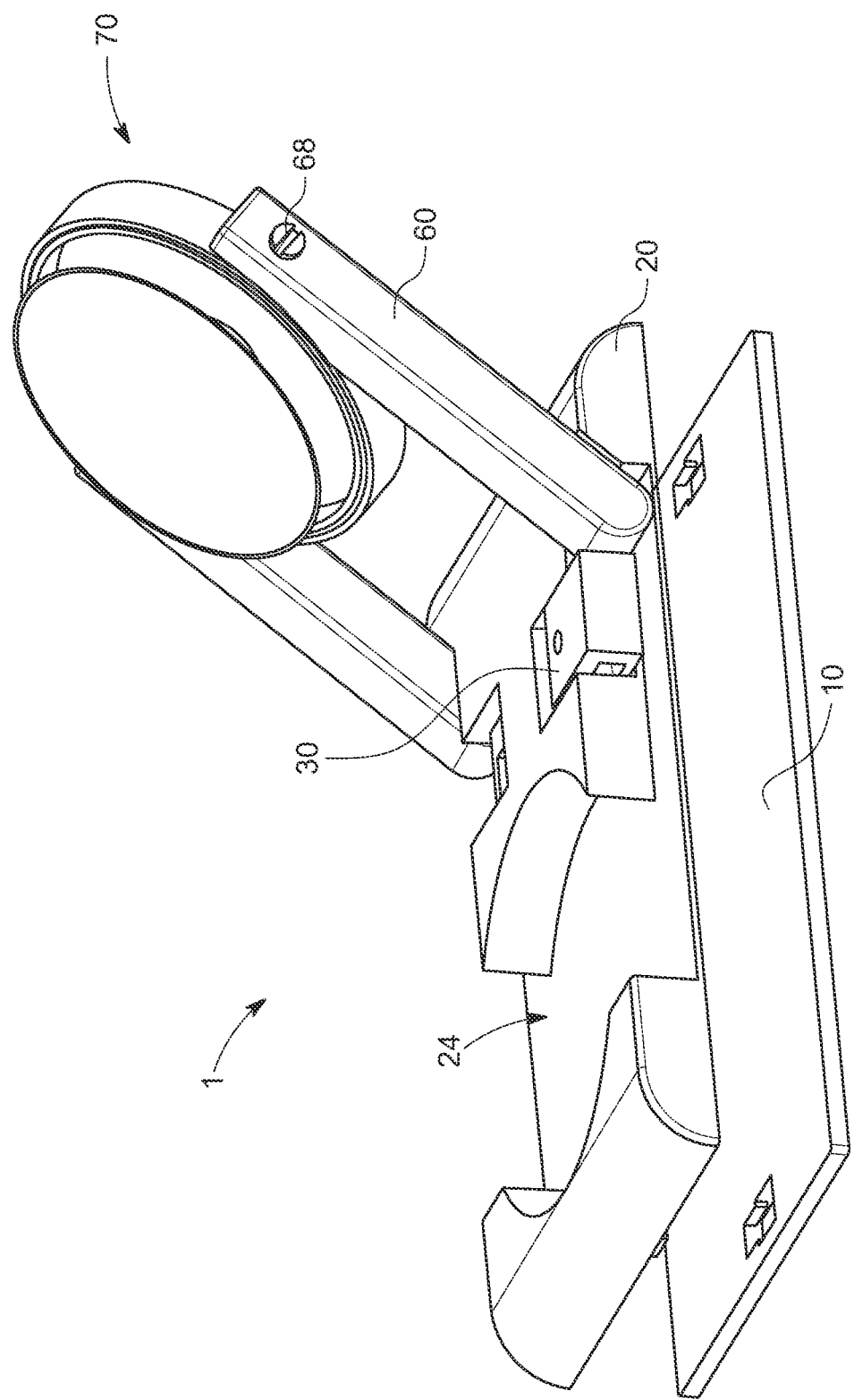
FIG. 1 illustrates a first isometric view of the folding phone support device.

Reference will now be made in detail to the presently preferred embodiments of the invention, examples of which are illustrated in the accompanying drawings. Throughout the following detailed description, the same reference numerals refer to the same elements in all figures.

Figure 2:
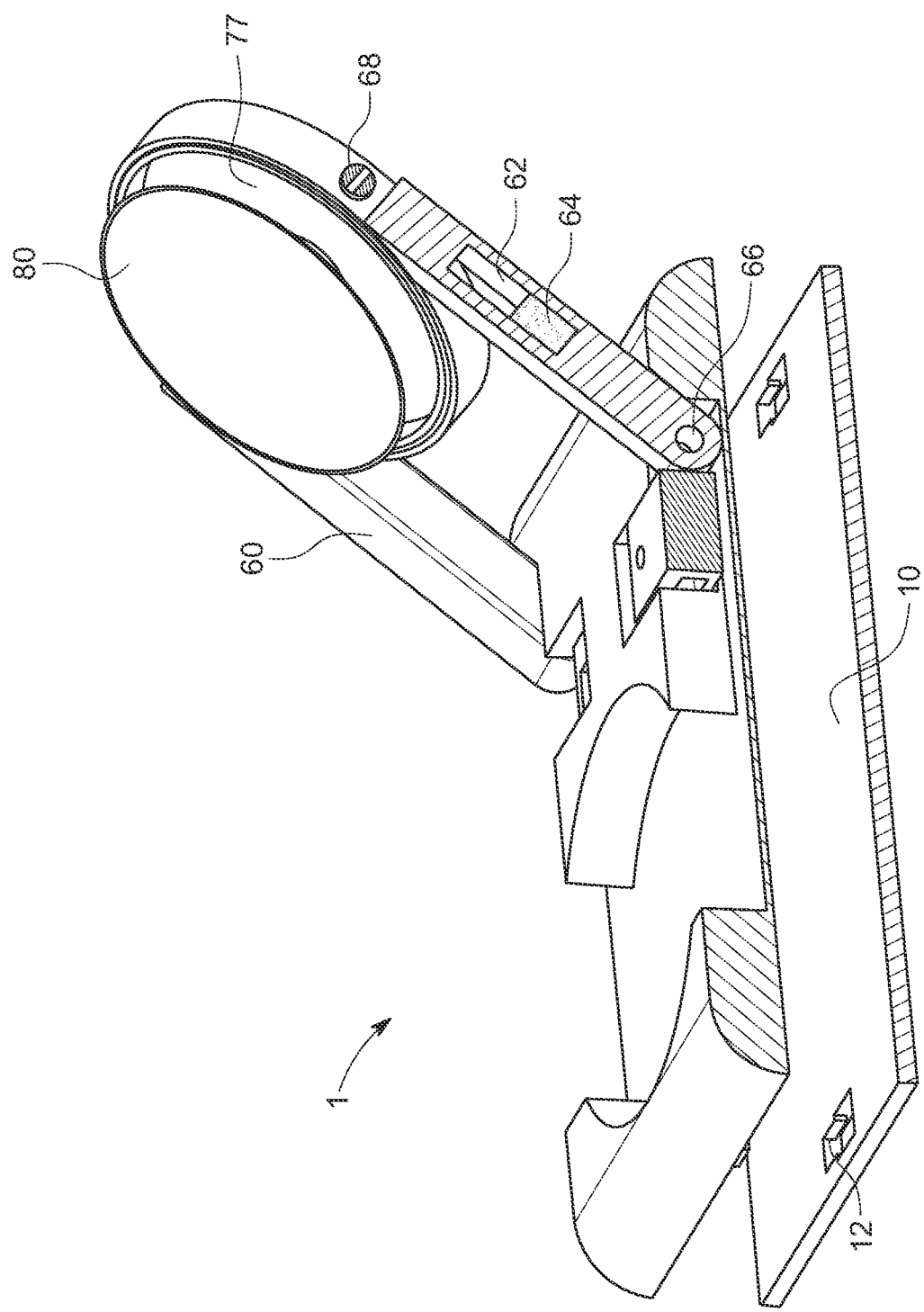
FIG. 2 illustrates a second isometric view, in cross-section, of the folding phone support device.

Referring to FIGS. 1 and 2, a first isometric view and second cross-sectional isometric view of the folding phone support device are shown.

The folding phone support device 1 is shown formed from primary components base 20 and phone plate 10.

The base 20 includes arms 60 that connect to head 70. A flap 30 can extend out of base 20 to block the folding motion of arm 60, thus keeping the head 70 in a deployed or unfolded position.

A recessed section forms head chamber 24 into which the head 70 can fold, recessing itself into the body 20.

The arms 60 rotate about an arm lower pivot point 66 and an arm upper pivot point 68. Within each arm is an optional arm magnet recess 62 with arm magnet 64. The arm magnets 64 can hold the arms 60 in a folded position, as discussed further below.

The phone plate 10 includes one or more recesses 12 that act to attach the base 20 to the phone plate 10.

Figure 5:
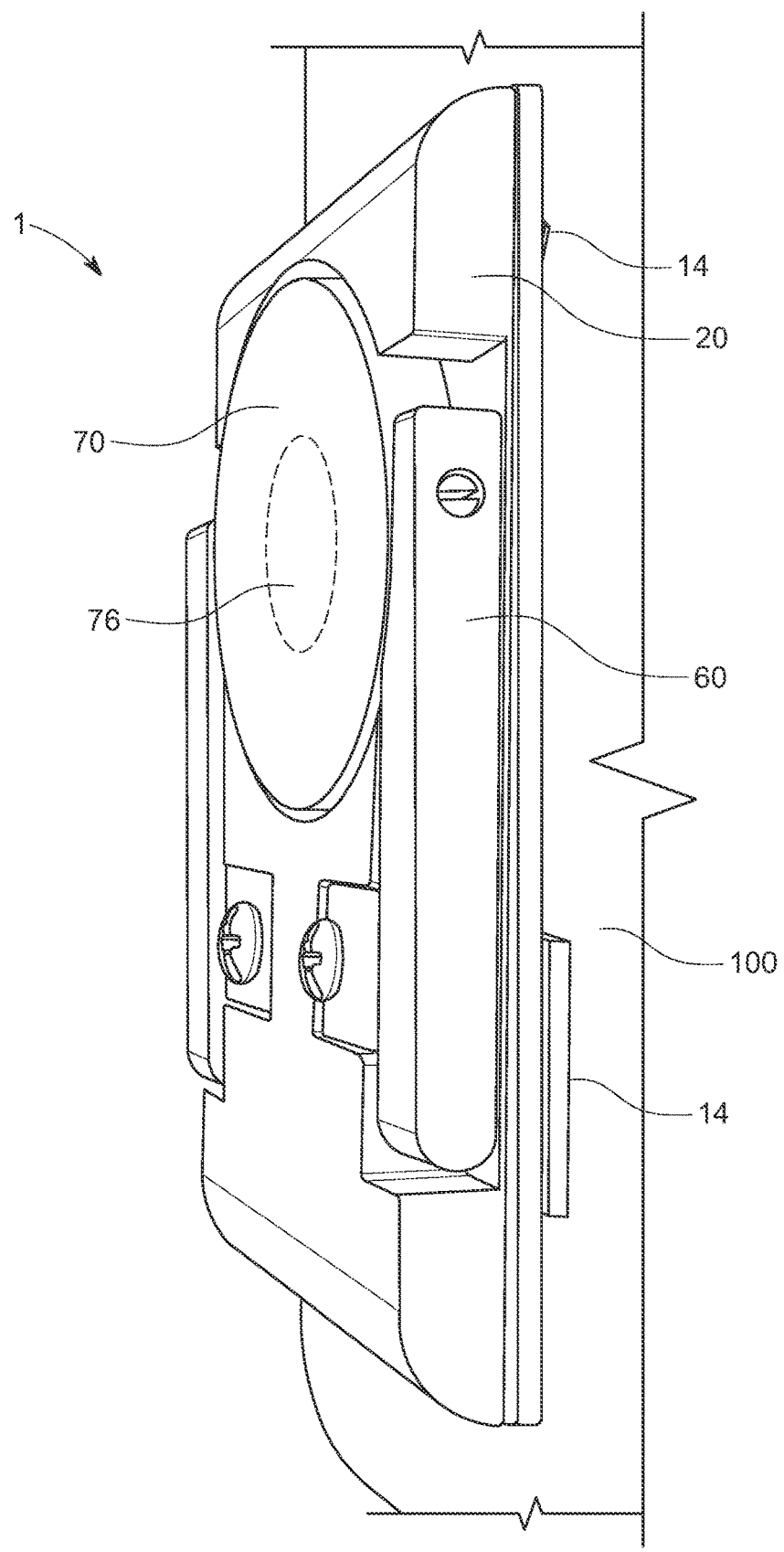
FIG. 5 illustrates a rear view of the folding phone support device.

An adhesive 14 is placed under the phone plate 10 to attach the phone plate 10 to a phone 100 (see FIG. 5).

Figure 3:
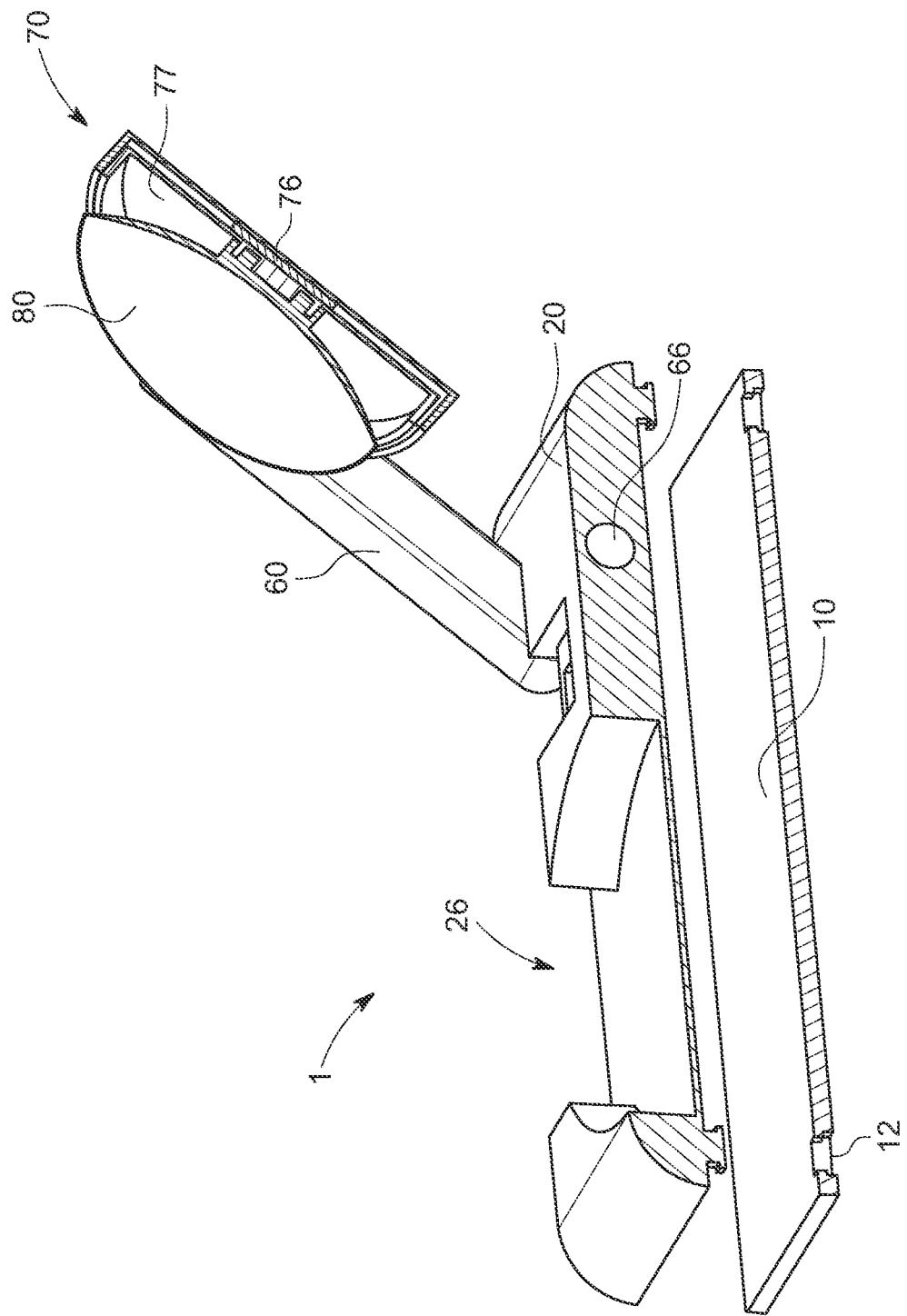
FIG. 3 illustrates a third isometric view, in cross-section, of the folding phone support device.
Figure 4:
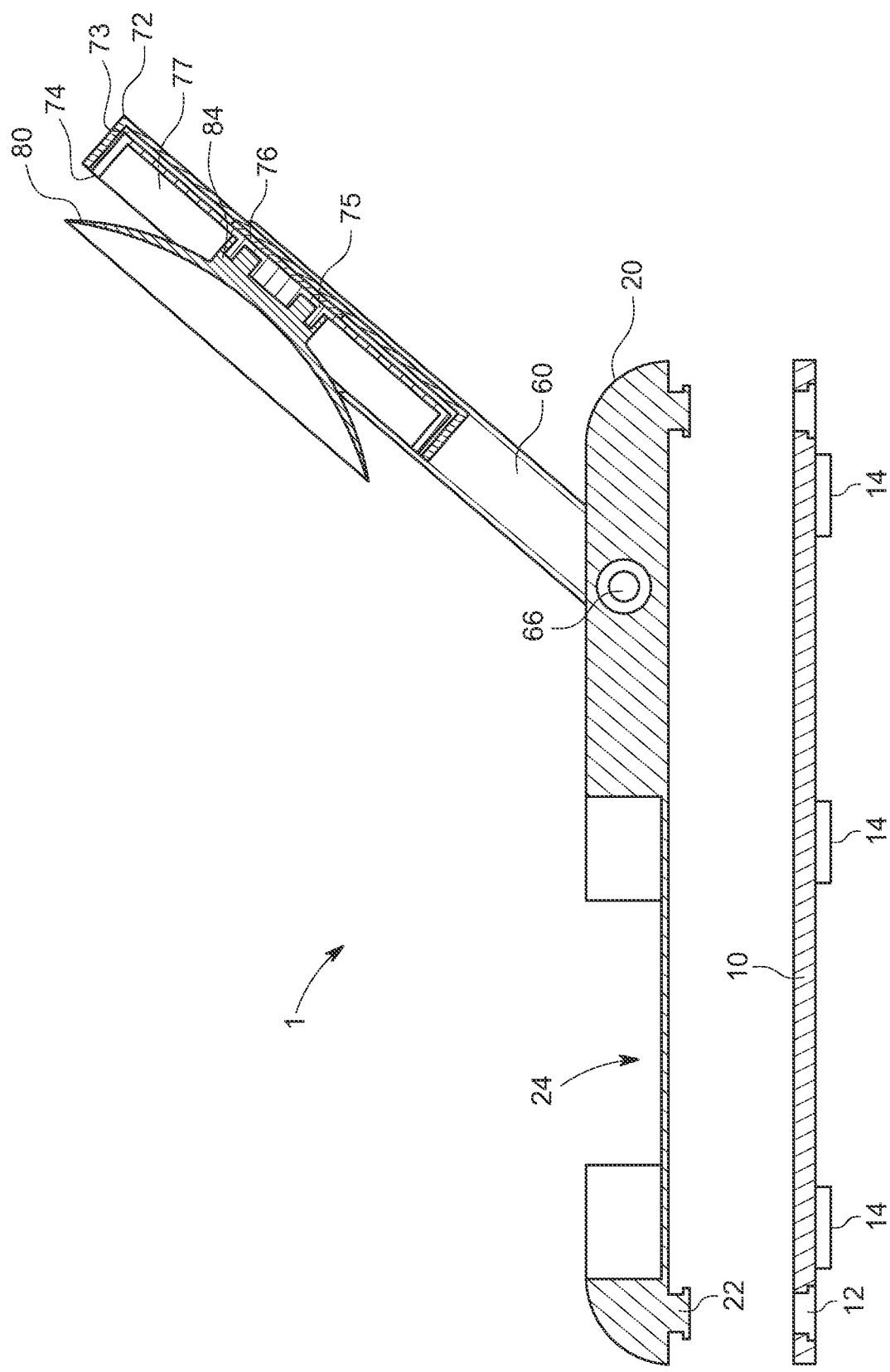
FIG. 4 illustrates a side view, in cross-section, of the folding phone support device.

Referring to FIGS. 3 and 4, a third isometric view, in cross-section, and a side view, in cross-section, of the folding phone support device are shown.

The head 70 is shown formed from head outer housing 72, including a head outer housing recess 73, into which the head inner housing 74 fits. Between the head outer housing 72 and the head inner housing 74 is sandwiched a head magnet 76.

Within the head inner housing recess 77 is a suction cup interface 75, interfacing with the suction cup head 84 of the suction cup 80.

The arms 60 rotate about the arm lower pivot point 66 with respect to the base 20.

The head 70, when folded, fits within the head chamber 24, with the arms accessing the head 70 via the side-gaps 26.

The phone plate 10 is shown with recesses 12, and adhesive 14.

Referring to FIG. 5, a rear view of the folding phone support device is shown.

The head 70 is folded inside the base, the arms 60 folded inward, with the head 70 rotated with the head magnet 76 facing outward.

The adhesive 14 is partially visible, holding the folding phone support device 1 to a phone 100.

Figure 6:
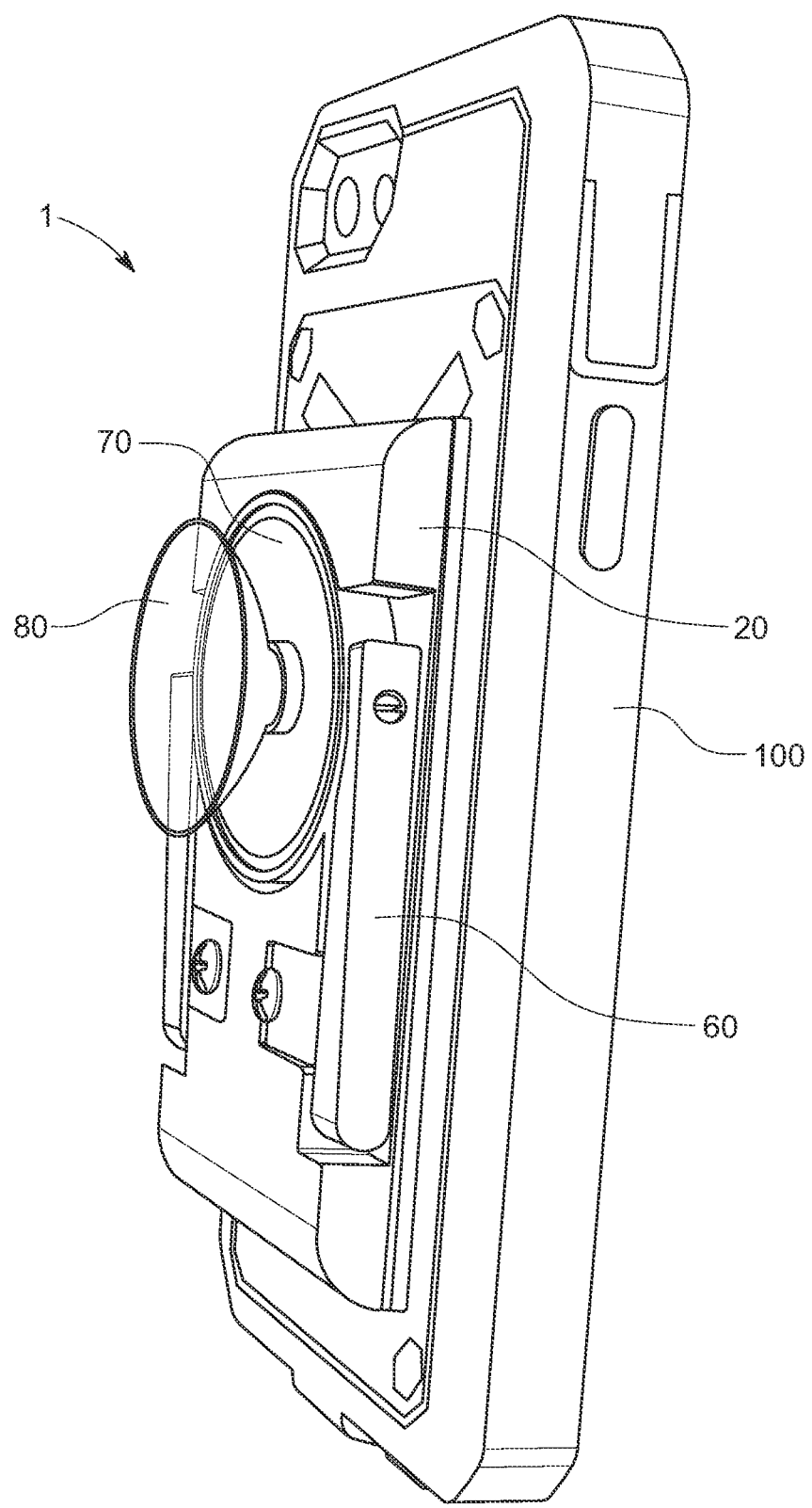
FIG. 6 illustrates a rear view, showing the suction cup, of the folding phone support device.

Referring to FIG. 6, a rear view, showing the suction cup of the folding phone support device, is shown.

The arms 60 are again against the base 20, but the head 70 is rotated to present the suction cup 80.

Figure 7:
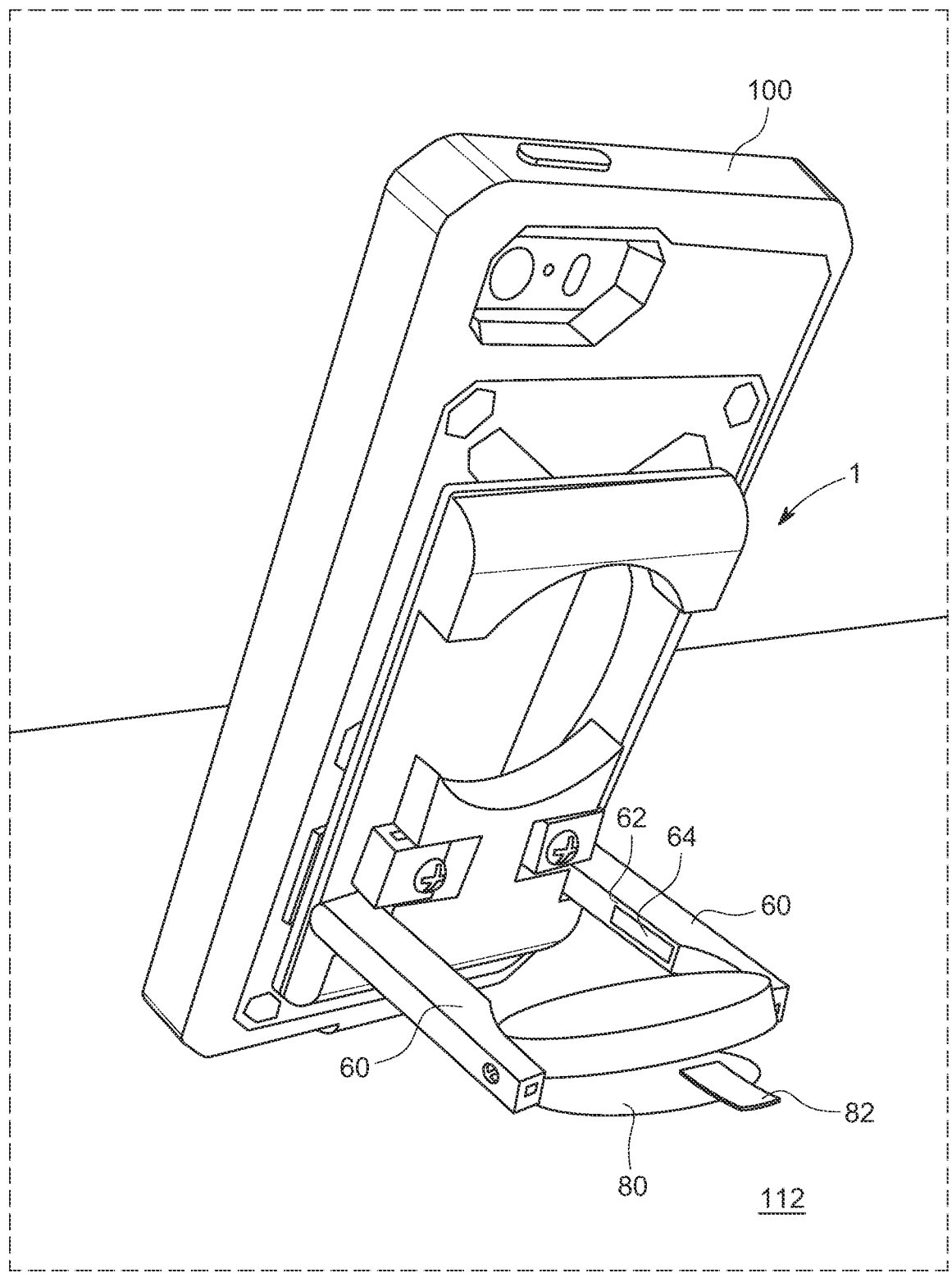
FIG. 7 illustrates a rear view, in an unfolded position, of the folding phone support device.

Referring to FIG. 7, a rear view, in an unfolded position, of the folding phone support device is shown.

The arms 60 are folded down, with an arm magnet recess 62 and arm magnet 64 visible.

The suction cup 80 is affixed to a horizontal surface 112, holding the folding phone support device 1 in place.

An optional suction cup tab 82 makes it easier for a user to release the suction cup 80.

Figure 8:
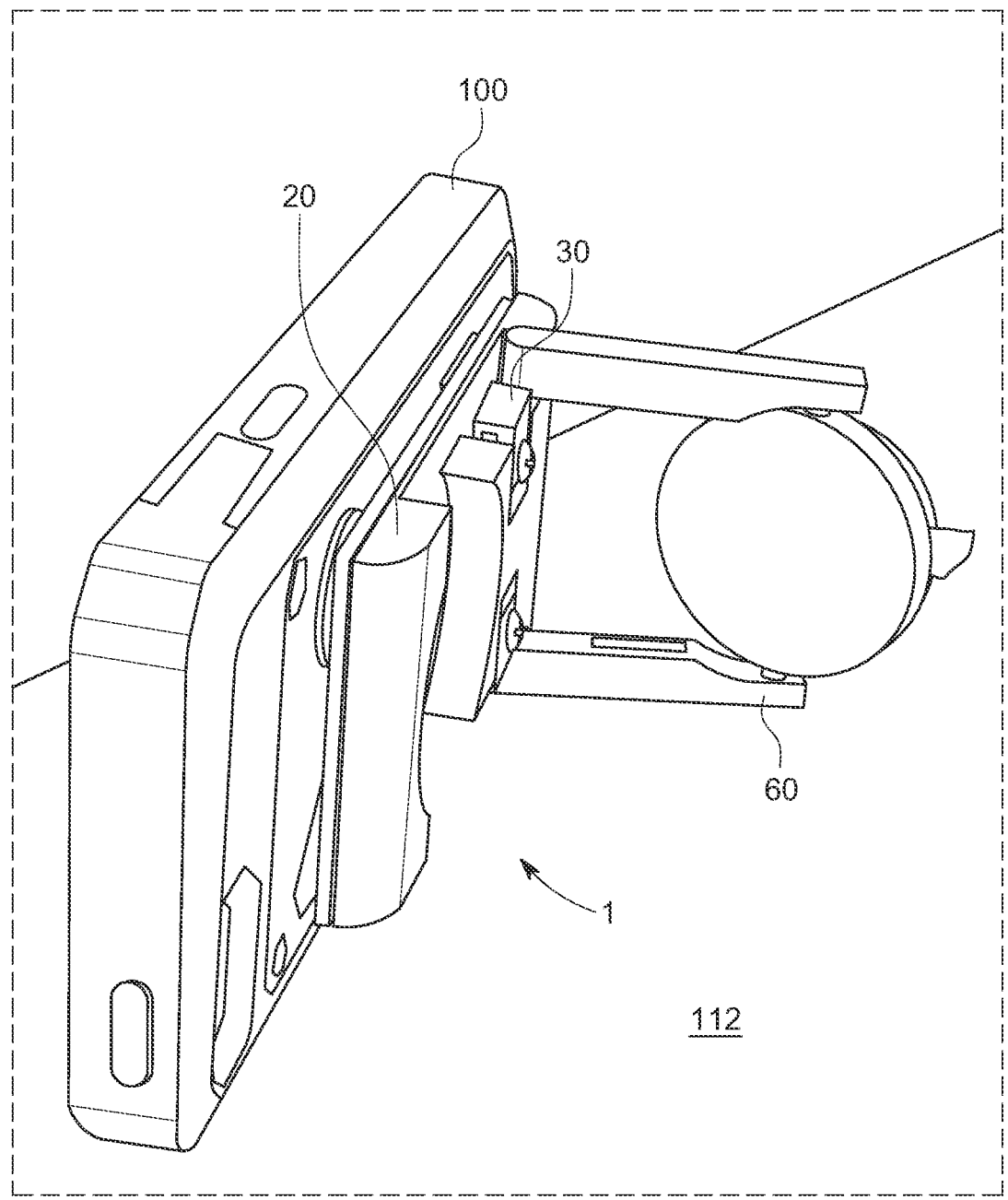
FIG. 8 illustrates a second rear view, in an unfolded position, of the folding phone support device.

Referring to FIG. 8, a second rear view, in an unfolded position, of the folding phone support device is shown.

The arms 60 are unfolded from the base 20, with flaps 30 extended to protect against undesired folding.

The arm 60 rests against the horizontal surface 112, supporting the phone 100.

Figure 9:
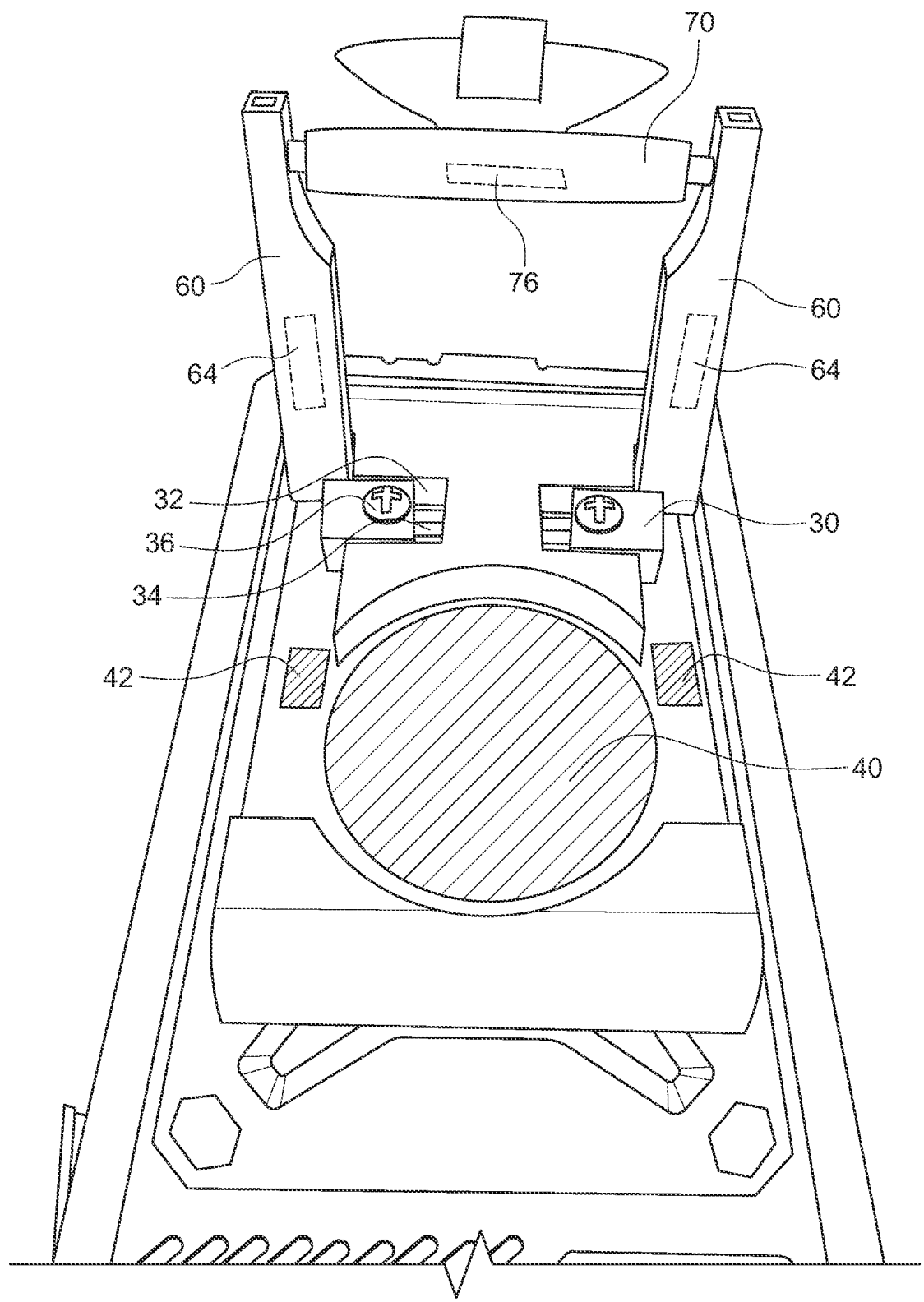
FIG. 9 illustrates a view showing the metal plates of the folding phone support device.

Referring to FIG. 9, a view showing the metal plates of the folding phone support device is shown.

The arms 60 are unfolded, with flaps 30 extended to prevent folding. Each flap 30 has an associated flap cavity 32. The flaps 30 are prevented from over-extending by a flap fastener slot 34 that holds a flap lock fastener 36.

To hold the head 70 in a folded position, the folding phone support device 1 can use magnets and metal plates to hold the head 70 in a folded position.

The magnets include the head magnet 76, attracted to the central metal plate 40, and the arm magnets 64, attracted to secondary metal plates 42.

Figure 10:
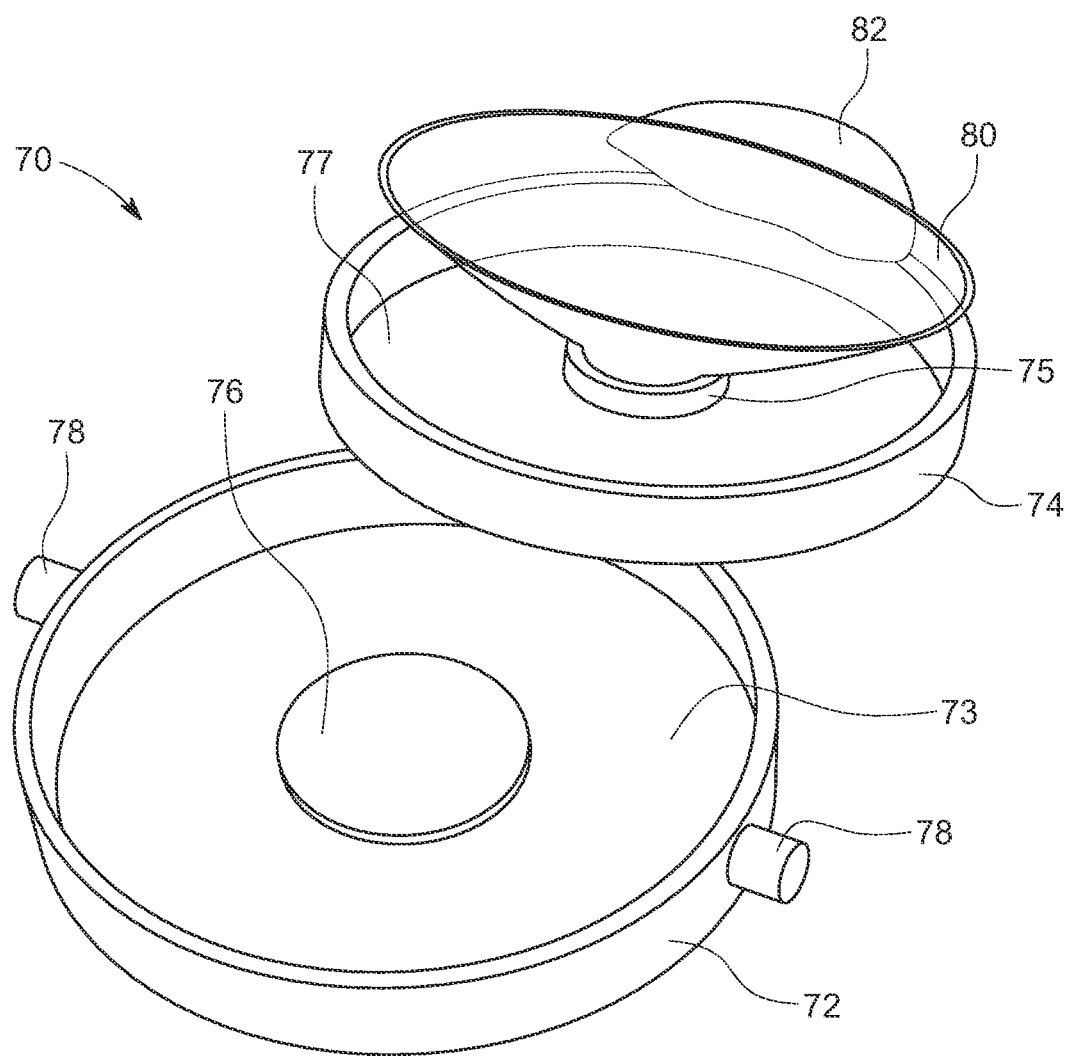
FIG. 10 illustrates a disassembled view of the head of the folding phone support device.

Referring to FIG. 10, a disassembled view of the head of the folding phone support device is shown.

The head 70 includes the head outer housing 72, head outer housing recess 73, head inner housing 74, suction cup interface 75, head magnet 76, head inner housing recess 77, pins 78.

The suction cup 80 includes an optional suction cup tab 82 to aid in removal, attached via the suction cup head 84 to the suction cup interface 75.

Figure 11:
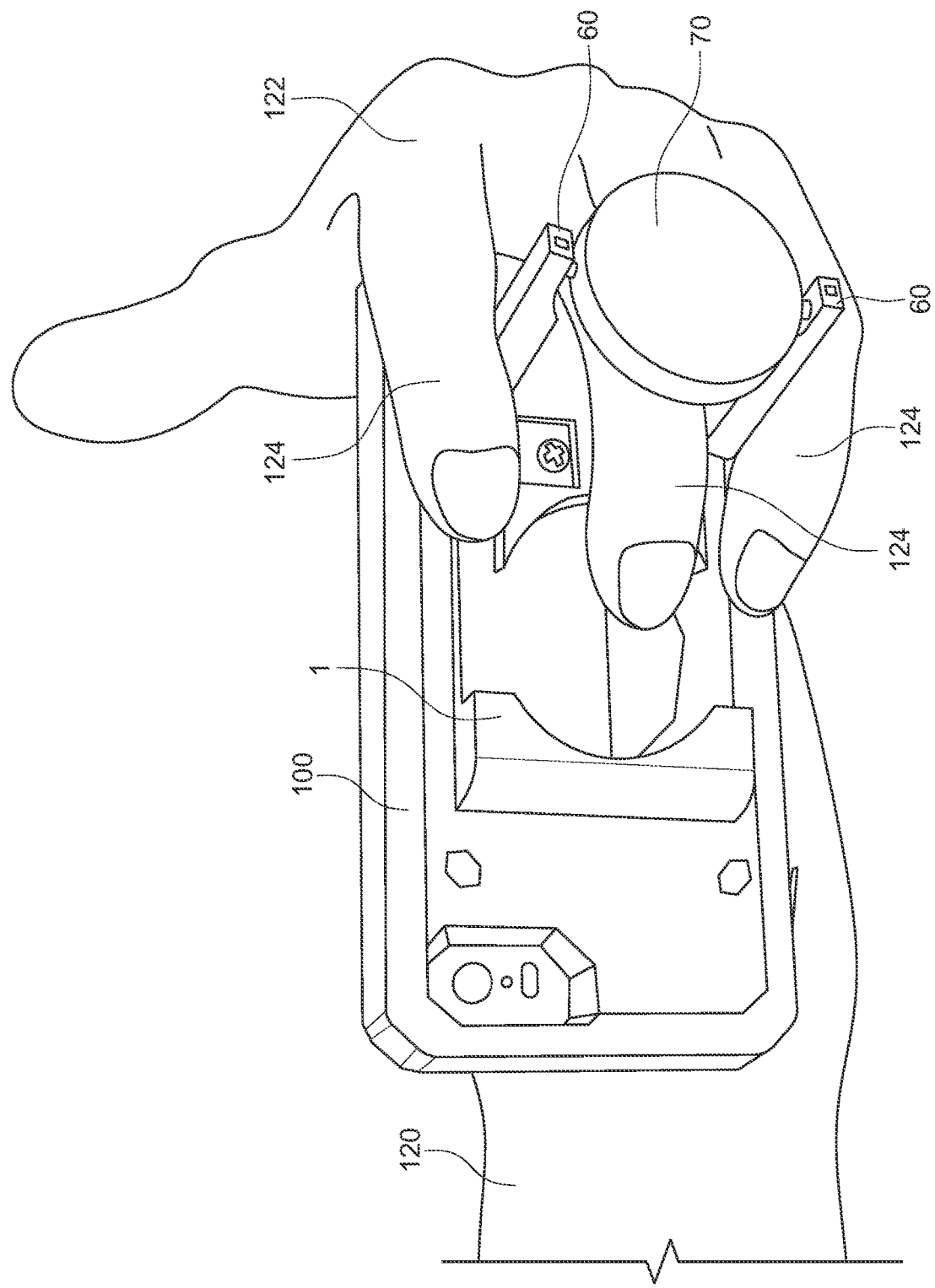
FIG. 11 illustrates a rear view, gripped by a user, of the folding phone support device.

Referring to FIG. 11, a rear view, gripped by a user, of the folding phone support device is shown.

The fingers 124 of the user's 120 hand 122 pass through the arms 60 of the folding phone support device 1, resulting in a secure grip.

Figure 12:
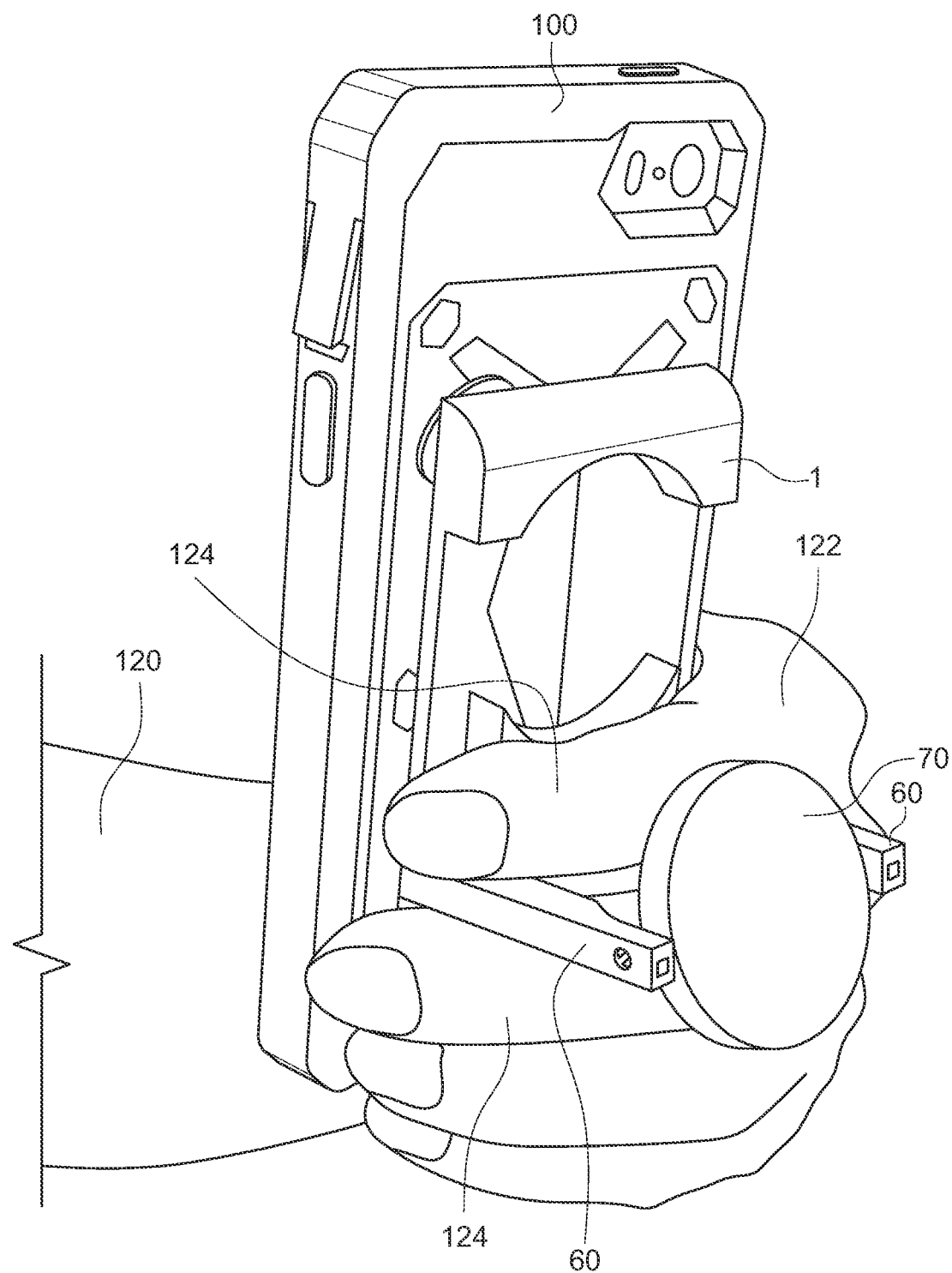
FIG. 12 illustrates a second rear view, gripped by a user, of the folding phone support device.

Referring to FIG. 12, a second rear view, gripped by a user, of the folding phone support device is shown.

The fingers 124 of the user's 120 hand 122 pass around the arms 60 of the folding phone support device 1, again resulting in a secure grip.

Figure 13:
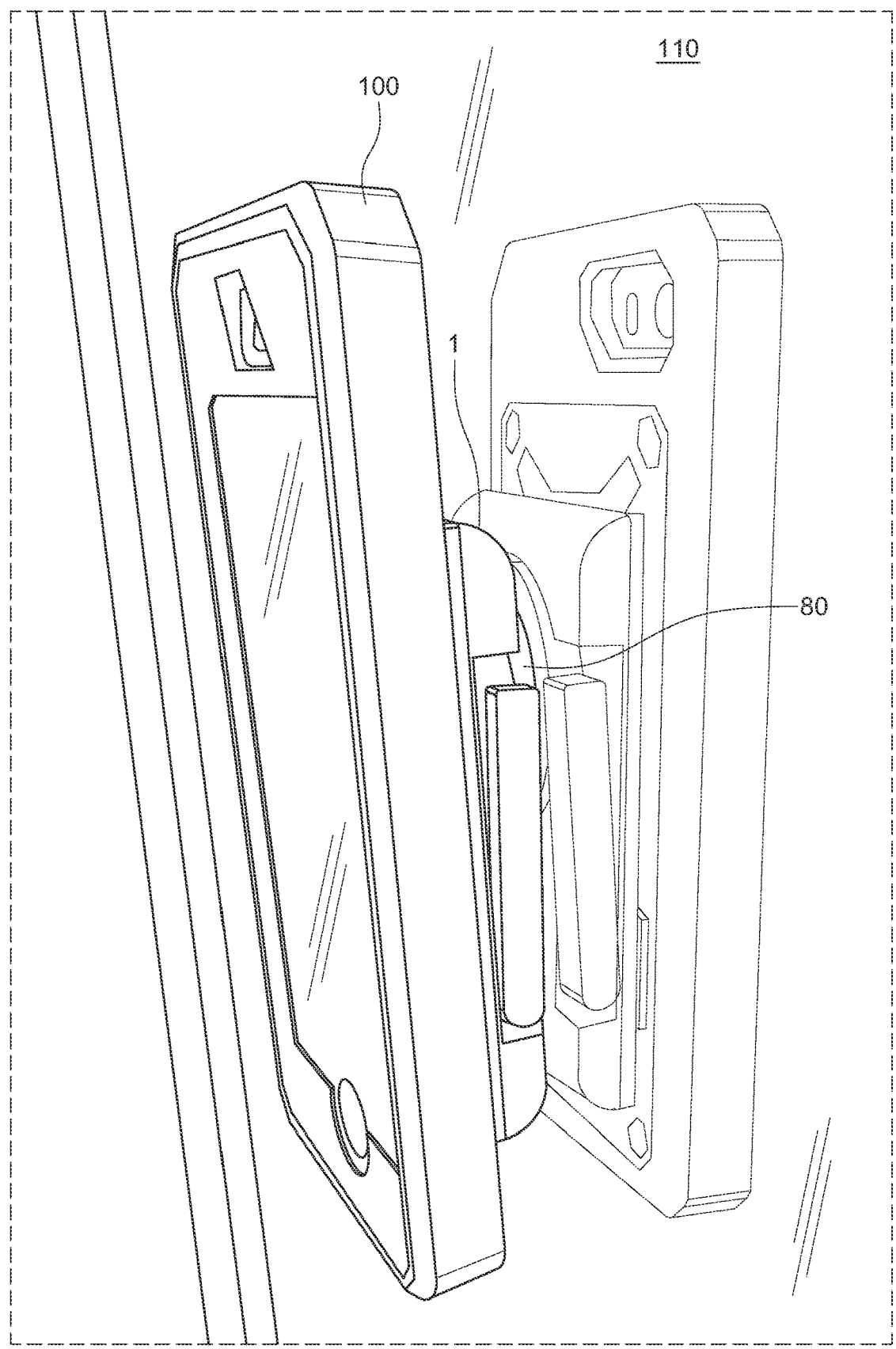
FIG. 13 illustrates a mounted position of the folding phone support device.

Referring to FIG. 13, a view mounted to a mirror of the folding phone support device is shown.

The suction cup 80 holds folding phone support device 1 to the vertical surface 110, supporting the phone 100.

Figure 14:
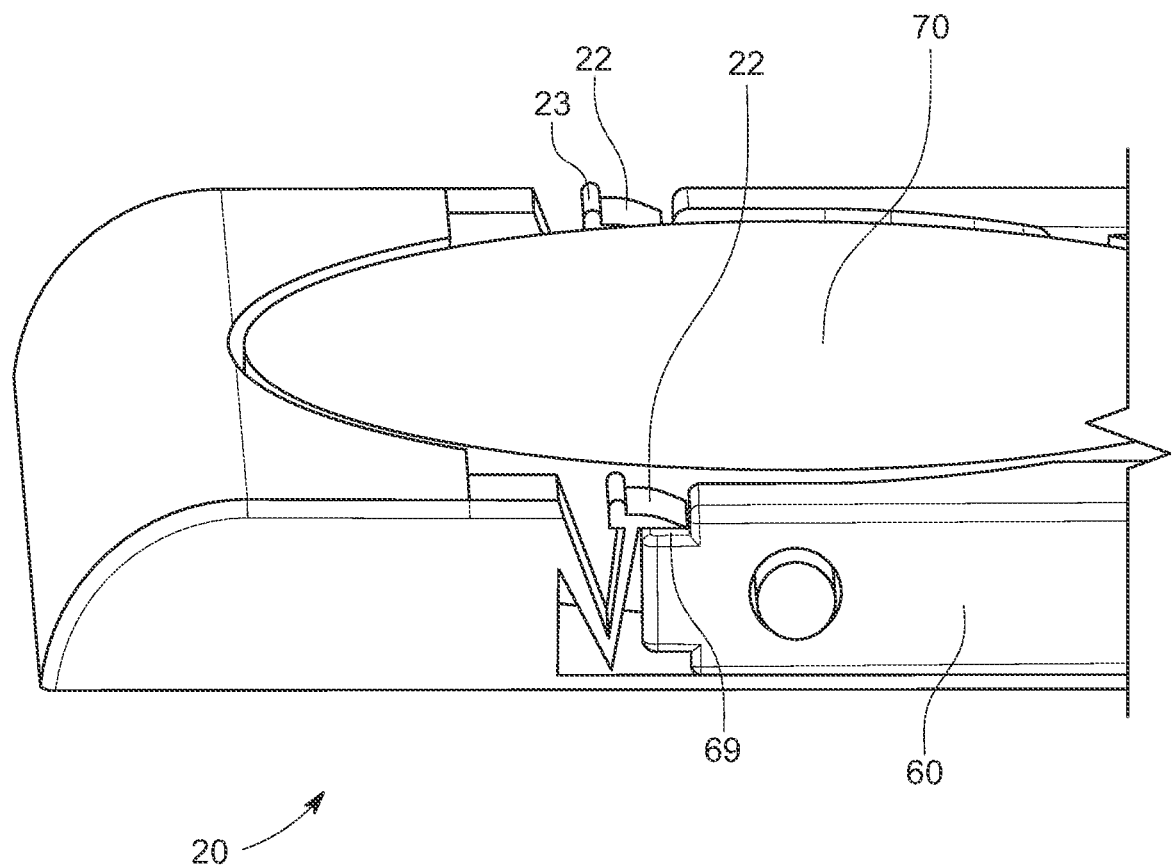
FIG. 14 illustrates a view of latches of the folding phone support device.

Referring to FIG. 14, the folding phone support device is shown with optional latches.

The base includes latches 22 that lock into arm latch faces 69 of the arms 60.

A user can pull on the latch tab 23 to deactivate the latch 22, allowing the arms 60 to be extended from the base 20.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A support device for a mobile phone, the support device comprising:
    a base;
    two parallel arms;
        the two parallel arms rotatably connected to the base;
    a head;
        the head rotatably connected to the two parallel arms;
        the head including a first temporary attachment mechanism and a second temporary attachment mechanism;
        the head having a first position nested within the base, and a second position extended away from the base;
    a flap;
        the flap sliding with respect to the base;
        the flap sliding into, and out of, a path of one or more of the two parallel arms;
        the flap prevents one or more of the two parallel arms from folding, thus maintaining one or more of the two parallel arms in an extended position, holding the head away from the base;
    whereby the head extends away from the base to support the mobile phone in an angled position with respect to a surface, or nests the head within the base to support the mobile phone in a parallel position with respect to a surface.

2. The support device of claim 1, wherein:
the first temporary attachment mechanism is a suction cup;
the second temporary attachment mechanism is a magnet;
the head able to rotate between the first temporary attachment mechanism and the second temporary attachment mechanism.

3. The support device of claim 2, further comprising:
a recess;
the recess within the base;
the recess sized to hold the head when the head is nested within the base.

4. The support device of claim 3, further comprising:
a central metal plate;
the central metal plate within the recess;
the central metal plate interacting with the magnet of the head, acting to keep the head nested within the recess.

5. The support device of claim 1, wherein:
the two parallel arms each include an arm magnet;
the base including one or more secondary metal plates positioned to interact with the arm magnet;
the arm magnet helping to hold the two parallel arms against the base by being attracted to the one or more secondary metal plates.

6. The support device of claim 1, further comprising:
a phone plate;
the phone plate affixed to the mobile phone;
the phone plate removably affixed to the base;
whereby the base is removable from the phone plate if the base is unneeded.

7. A device to support a mobile phone, the device including:
two parallel articulated arms;
a base connected to, and separating, the two parallel articulated arms;
the base including a head chamber;
a head connected to, and separating, the two parallel articulated arms;
the head able to nest within the head chamber of the base;
the head able to extend away from the base as the two parallel articulated arms rotate away from the base;
the head including a first side with a suction cup;
the head including a second side with a magnet;
a flap;
the flap sliding with respect to the base;
the flap sliding into, and out of, a path of one or more of the two parallel articulated arms;
the flap prevents one or more of the two parallel articulated arms from folding, thus maintaining the one or more of the two parallel articulated arms in an extended position, holding the head away from the base;
whereby the head rotates between the first side and the second side, thus allowing the device to affix to a variety of surfaces.

8. The device of claim 7, wherein:
the head rotates between the first side with the suction cup and the second side with the magnet before affixing the device to a surface.

9. The device of claim 8, further comprising:
a recess;
the recess within the base;
the recess sized to hold the head when the head is nested within the base.

10. The device of claim 9, further comprising:
a central metal plate;
the central metal plate within the recess;
the central metal plate interacting with the magnet of the head, acting to keep the head nested within the recess.

11. The device of claim 7, wherein:
the two parallel articulated arms each include an arm magnet;
the base including one or more secondary metal plates positioned to interact with the arm magnet;
the arm magnet helping to hold the two parallel articulated arms against the base by being attracted to the one or more secondary metal plates.

12. The device of claim 7, further comprising:
a phone plate;
the phone plate affixed to the mobile phone;
the phone plate removably affixed to the base;
whereby the base is removable from the phone plate if the base is unneeded.

13. A folding support for a mobile phone, the folding support including:
a base;
two rotating arms extending from the base;
the two rotating arms being independent and spaced apart from each other;
the two rotating arms having a nested position, parallel to the base;
the two rotating arms having an extended position, non-parallel to the base;
a head placed between the two rotating arms;
the head including a first side and a second side;
the first side including a first attachment mechanism;
the second side including a second attachment mechanism;
a flap;
the flap sliding with respect to the base;
the flap sliding into, and out of, a path of one or more of the two rotating arms;
the flap prevents one or more of the two rotating arms from folding, thus maintaining one or more of the two rotating arms in an extended position, holding the head away from the base;
whereby the head rotates to the first side or the second side to choose between the first attachment mechanism and the second attachment mechanism.

14. The folding support of claim 13, wherein:
the first attachment mechanism is a suction cup;
the second attachment mechanism is a magnet;
the head rotates between the first attachment mechanism and the second attachment mechanism.

15. The folding support of claim 14, further comprising:
a recess;
the recess within the base;
the recess sized to hold the head when the head is nested within the base.

16. The folding support of claim 15, further comprising:
a central metal plate;
the central metal plate within the recess;
the central metal plate interacting with the magnet of the head, acting to keep the head nested within the recess.

17. The folding support of claim 13, wherein:
the two rotating arms each including an arm magnet;
the base including one or more secondary metal plates positioned to interact with the arm magnet;

the arm magnet helping to hold the two rotating arms against the base by being attracted to the one or more secondary metal plates.

* * * * *